United States Patent [19]

Hamon et al.

[11] Patent Number: 6,063,351
[45] Date of Patent: May 16, 2000

[54] CATALYST, IN PARTICULAR FOR REDUCING NO$_x$, AND METHOD FOR REDUCING NO$_x$

[75] Inventors: Christian Hamon, Saint-Nazaire; Olivier Le Lamer; Nadége Morio, both of Lorient; Jacques Saint-Just, Le Pecq, all of France

[73] Assignee: Gaz de France, Paris, France

[21] Appl. No.: 09/288,559

[22] Filed: Apr. 9, 1999

Related U.S. Application Data

[63] Continuation of application No. PCT/FR97/01704, Sep. 26, 1997.

[51] Int. Cl.[7] ................................................. B01D 53/56
[52] U.S. Cl. ........................... 423/239.2; 502/64; 502/66; 502/74; 502/78
[58] Field of Search ........................ 423/239.2; 502/64, 502/66, 74, 78

[56] References Cited

U.S. PATENT DOCUMENTS

| | | | |
|---|---|---|---|
| 4,191,632 | 3/1980 | Cosyns et al. ........................... | 585/483 |
| 4,910,004 | 3/1990 | Hamon et al. ........................... | 423/239 |
| 5,059,569 | 10/1991 | Deschamps et al. ..................... | 502/78 |
| 5,149,512 | 9/1992 | Li et al. ................................... | 423/239 |
| 5,233,111 | 8/1993 | Notte et al. ............................... | 585/467 |
| 5,364,606 | 11/1994 | Hung ...................................... | 423/239.2 |
| 5,407,651 | 4/1995 | Kawai ..................................... | 423/213.2 |
| 5,582,810 | 12/1996 | Tretjak ................................... | 423/239.2 |
| 5,985,225 | 11/1999 | Ohtsuka etr al. .................... | 423/239.2 |
| 5,993,764 | 11/1999 | Tabata et al. ........................ | 423/239.2 |

FOREIGN PATENT DOCUMENTS

| | | |
|---|---|---|
| 0 286 507 | 10/1988 | European Pat. Off. . |
| 0 325 511 | 7/1989 | European Pat. Off. . |
| 0 499 286 | 8/1992 | European Pat. Off. . |
| 0 625 369 | 11/1994 | European Pat. Off. . |
| 05 11 751 | 5/1993 | Japan . |
| 05 208 138 | 8/1993 | Japan . |

*Primary Examiner*—Tom Dunn
*Attorney, Agent, or Firm*—Pennie & Edmonds LLP

[57] ABSTRACT

The invention concerns a catalyst, in particular for reducing NO$_x$, using methane or any mixture containing mostly methane. The catalyst consists of a zeolite of mordenite structure with "small pores" exchanged with Pd and/or Co. The invention is useful for reducing nitrogen oxides.

9 Claims, 2 Drawing Sheets

CATALYST, IN PARTICULAR FOR REDUCING $NO_x$, AND METHOD FOR REDUCING $NO_x$

This application is a continuation of PCT/FR97/01,704, filed Sep. 26, 1997.

BACKGROUND OF THE INVENTION

The invention relates to a catalyst, in particular for reducing $NO_x$, as well as to a method of reducing $NO_x$.

Numerous methods of converting $NO_x$ into nitrogen are known.

For example, U.S. Pat. No. 5,149,512 describes a method of reducing $NO_x$ using methane, in the presence of oxygen, in which a catalyst consisting of a zeolite in particular of mordenite structure with a pore size of between 5 and 15 Å, exchanged with cobalt, is used.

However, the rate of conversion of $NO_x$ into nitrogen is very poor, that is to say in the neighbourhood of 27% at 450° C. Moreover, this catalyst is exchanged with high percentages of cobalt, more specifically with 5.5% by weight of cobalt in relation to the total weight of the catalyst.

Moreover, European patent application No. EP-A-0 286 507 describes the use of a zeolite of mordenite structure in ammonium or acid form with socalled "large pores", that is to say with a pore size greater than 6.6 Å, for the reduction of $NO_x$ in the presence of oxygen. This document also describes the use of a zeolite of mordenite structure with socalled "small pores", that is to say with a pore size of less than 4.4 Å, exchanged with copper for the reduction of $NO_x$ in the presence of oxygen. However, in the latter case, ammonia is used as $NO_x$ reducing agent. In fact, the use and the storage of ammonia are very difficult. Moreover, no mention was made in this document of the activity of these catalysts in terms of percentage of conversion of $NO_x$.

SUMMARY OF THE INVENTION

The invention aims to overcome the disadvantages linked with the use of ammonia and at the same time to obtain better $NO_x$ conversion rates.

To that end, the invention proposes a catalyst, characterized in that it consists of a zeolite of mordenite structure "with small pores" exchanged with Pd and/or Co.

According to a first method of producing the catalyst of the invention, the zeolite is exchanged with Pd, only, with a percentage of cations $Pd^{2+}$ of between approximately 0.4% and approximately 0.6% by weight in relation to the total weight of the catalyst.

According to a second method of producing the catalyst of the invention, the zeolite is exchanged with Co, only, with a percentage of cations $Co^{2+}$ of between approximately 1.2% and approximately 3.2% by weight in relation to the total weight of the catalyst.

According to a particularly preferred method of producing the catalyst of the invention, the zeolite is exchanged with between approximately 0.4% and approximately 0.6% by weight of cations $Pd^{2+}$ and between approximately 1.2% and approximately 3.2% by weight of cations $Co^{2+}$, in relation to the total weight of the catalyst.

According to one characteristic of the catalysts according to the invention, the zeolite is in sodic form or in ammonium form with an Si/Al ratio equal to 5.5.

The invention also proposes a method of reducing $NO_x$ using methane or any mixture containing mostly methane, characterized in that it consists of bringing a reactional medium containing $NO_x$ and methane into contact with the catalyst according to the invention.

The method of reducing $NO_x$ according to the invention is further characterized in that the reactional medium also contains oxygen.

In the method of the invention, the reactional medium may also contain sulphur compounds.

The invention also aims at a catalyst for reducing $NO_x$ using methane or any mixture containing mostly methane, consisting of a zeolite of mordenite structure "with small pores" exchanged with Pd and/or Co.

More specifically, this catalyst for reducing $NO_x$ according to the invention is a zeolite of mordenite structure "with small pores" exchanged with between approximately 0.4% and approximately 0.6% by weight of Pd and/or between approximately 1.6% and approximately 3.2% by weight of Co in relation to the weight of the catalyst.

Again more specifically, the zeolite making up the catalyst for reducing $NO_x$ according to the invention has an Si/Al molar ratio equal to 5.5.

Further details, characteristics and advantages of the invention will be made clearer in the following detailed description, reference being made therein to the attached drawings which are as follows:

DETAILED DESCRIPTION OF THE INVENTION

Figure 1:
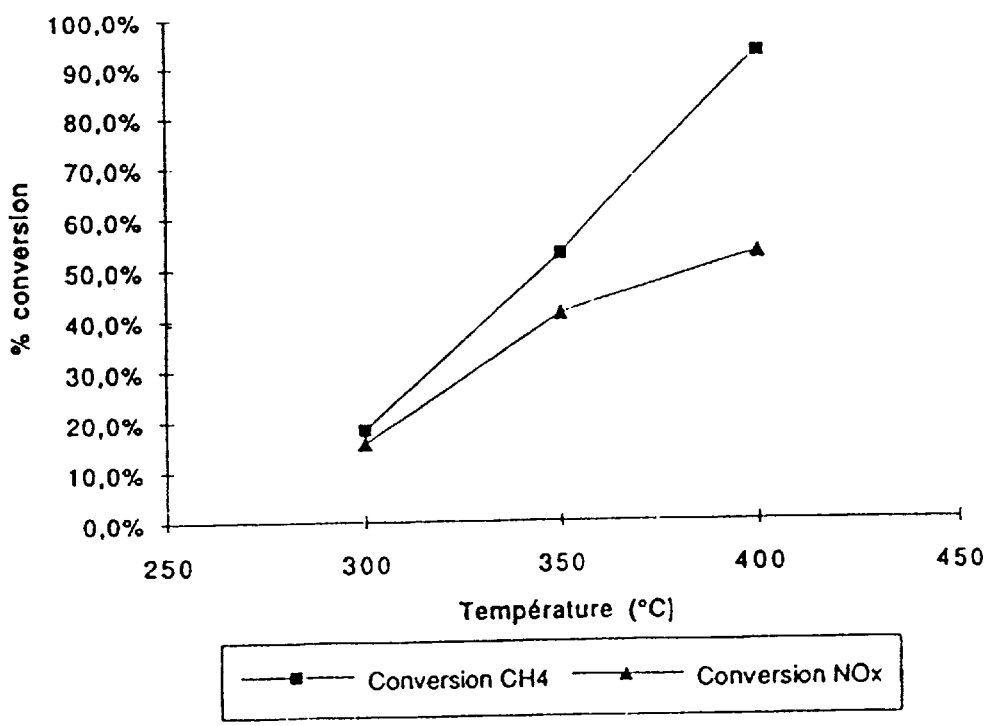
FIG. 1 illustrates the conversion percentages of $NO_x$ and $CH_4$ obtained with a catalyst according to the invention consisting of a zeolite of mordenite structure with "small pores" exchanged with 0.5% by weight of Pd in relation to the total weight of the catalyst, in the presence of 10% oxygen, depending on the reduction temperature.

The catalyst, in particular for selectively reducing $NO_x$, according to the invention is a zeolite of mordenite structure of the variety known as "with small pores", that is to say that this zeolite does not adsorb benzene molecules which have a kinetic diameter of approximately 6.6 Å. For this reason, hereafter and in the above, a zeolite with mordenite structure will be designated as having "small pores" when the diameter of these pores is smaller than 5 Å and as having "large pores" when the diameter of these pores is larger than 5 Å.

In both cases, the zeolite of mordenite structure has an Si/Al molar ratio of 5.5. It is a powdered mordenite in sodic form (NaM) or preferably in ammonium form ($NH_4M$). The catalysts of the invention are prepared by exchange from a solution of cobalt, palladium or palladium/cobalt salts, in a way which is known per se.

The salts used for the exchanges in aqueous solution are palladium tetramine and cobalt acetate.

The zeolites are then formed into granules by pelleting with approximately 10% by weight of a silica-based binding agent in relation to the total weight of the catalyst, then granulation and sieving at 0.5–1 mm.

The catalysts are then activated in air at 500° C. for two hours then evaluated in catalytic reduction using methane in a tubular reactor made of stainless steel surrounded by heating shells. The temperature is controlled by regulators and the concentration of the different gases at the entrance of the reactor is ensured by mass flowmeters. The concentrations of NO and $NO_2$, in the gaseous mixtures, were measured by chemiluminescence, and the concentrations of $N_2O$ by infrared.

As has already been said here, a zeolite of mordenite structure with "small pores" has already been used for the reduction of nitrogen oxides in the presence of oxygen. However, this reduction is effected using ammonia as reducing agent and the zeolite was exchanged with copper.

However, no result as to the activity of such a catalyst was given in terms of percentage of conversion of $NO_x$.

In that case, two catalysts were prepared, one consisting of a zeolite of mordenite structure with "small pores" exchanged with 2.5% by weight of Cu and the other consisting of a zeolite of mordenite structure with "large pores" exchanged with 2.25% Cu, as described above. These two catalysts were tested as to their activities for converting $NO_x$ into nitrogen using ammonia as reducing agent in the presence of 5% oxygen.

The experimental conditions were as follows:

| Test conditions: | NO: | 500 ppm |
|---|---|---|
| | $NH_3$: | 550 ppm |
| | $O_2$: | 5% by volume in relation to the total gaseous volume |
| | VVH: | 20,000 $h^{-1}$ |

VVH = hourly space velocity

The results are given in Table 1 as follows:

TABLE 1

| Catalyst | T ° C. | Conversion $NO_x$ % |
|---|---|---|
| Mordenite with "large pores" exchanged with Cu | 150 | 60.5 |
| | 200 | 99.6 |
| | 250 | 100 |
| Mordenite with "small pores" exchanged with Cu | 200 | 72.6 |
| | 250 | 94 |
| | 300 | 91 |

According to the results given in Table 1, it can be seen that the catalyst consisting of a mordenite with "large pores" exchanged with copper has a greater activity than the catalyst consisting of a mordenite with "small pores" with the same rate of exchange of copper, for the selective reduction of the nitrogen oxides using ammonia.

However, despite the teachings of the prior art and the results obtained above using a catalyst consisting of a mordenite with "small pores", surprisingly it was discovered that a catalyst consisting of a zeolite of mordenite structure with "small pores" exchanged with Co and/or Pd allowed very much greater conversion percentages of $NO_x$ into $N_2$ to be obtained than those obtained using an identical catalyst, but consisting of a zeolite with "large pores", even in the presence of water, oxygen and even sulphur compounds such as $SO_2$, as will be discussed below.

So as to better understand the object and advantages of the invention, several methods of implementing it are now described below by way of examples which are purely illustrative and non-limitative.

EXAMPLE 1

$NO_x$ Reducing Activity of a Catalyst According to the Invention Containing 0.5% by Weight of Pd As described previously, a catalyst was prepared consisting of a zeolite of mordenite structure with "small pores" exchanged with 0.5% by weight of Pd in relation to the total weight of the catalyst. The basic mordenite was a mordenite in its ammonium form. This catalyst was then tested under the following conditions:

| Test conditions: | NO: | 200 ppm |
|---|---|---|
| | $CH_4$: | 300 ppm |
| | $O_2$: | 10% by volume in relation to the total gaseous volume |
| | VVH: | 10,000 $h^{-1}$ |

VVH = hourly space velocity

The results in percentage of conversion of $NO_x$ and $CH_4$ dependent upon the reduction temperature are given in Table 2 below:

TABLE 2

| Temperature | Conversion (%) | |
|---|---|---|
| (° C.) | $CH_4$ | $NO_x$ |
| 300 | 18.2% | 15.4% |
| 350 | 52.7% | 41.0% |
| 400 | 92.7% | 53.0% |

These results are also illustrated in the form of a graph in the attached FIG. 1.

From Table 2 above and from the attached FIG. 1, it can be seen that the catalyst according to the invention consisting of a zeolite of mordenite structure with "small pores" exchanged with 0.5% by weight of palladium in relation to the total weight of the catalyst has a good $NO_x$ reducing activity at relatively low temperatures of between 300 and 350° C. The conversion maximum obtained is approximately 53% at 400° C. and this in the presence of 10% by volume of oxygen in relation to the total gaseous volume.

EXAMPLE 2

$NO_x$ Reducing Activity of a Catalyst According to the Invention Containing 1.6% by Weight of Co A catalyst consisting of a zeolite of mordenite structure with "small pores", exchanged with 1.6% by weight of cobalt in relation to the total weight of the catalyst, was prepared as described previously from a mordenite in ammonium form.

This catalyst was then tested under the following conditions:

| Test conditions: | NO: | 200 ppm |
|---|---|---|
| | $CH_4$: | 300 ppm |
| | $O_2$: | 10% by volume in relation to the total gaseous volume |
| | VVH: | 10,000 $h^{-1}$ |

VVH = hourly space velocity

The percentages of conversion of $NO_x$ and $CH_4$ dependent on the temperature of the reduction reaction are given in Table 3 below and illustrated in the form of a graph in the attached FIG. 2.

TABLE 3

| Temperature | Conversion (%) | |
|---|---|---|
| (° C.) | $CH_4$ | $NO_x$ |
| 400 | 14.0% | 24.7% |
| 450 | 56.0% | 61.5% |
| 500 | 96.0% | 64.1% |

Figure 2:
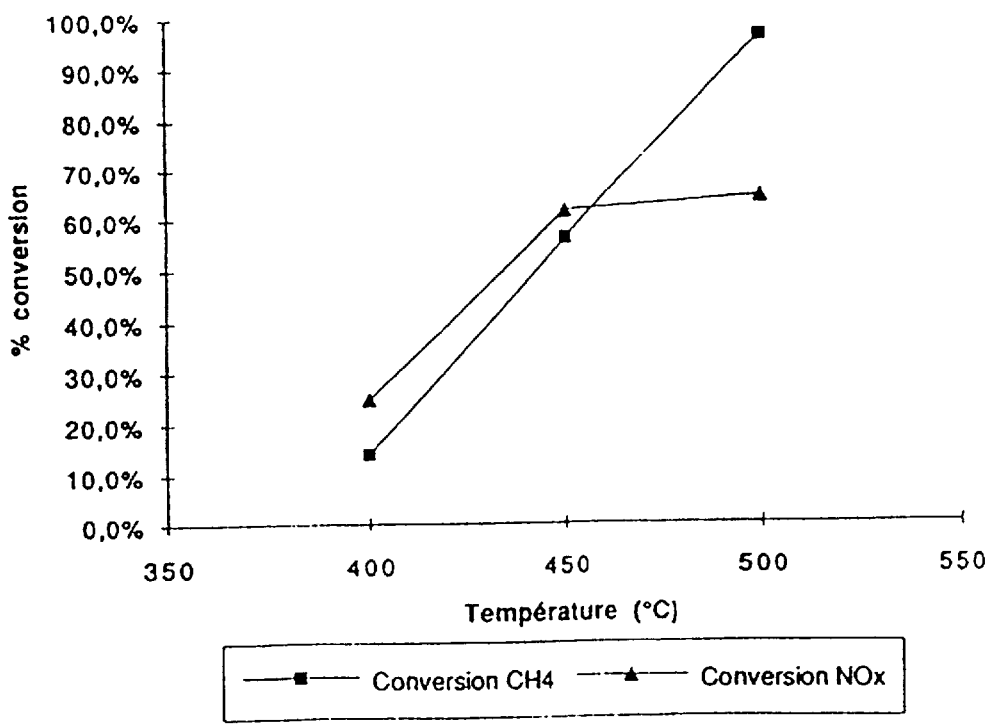
FIG. 2 illustrates the conversion percentages of $NO_x$ and $CH_4$ using a catalyst according to the invention consisting of a zeolite of mordenite type with "small pores" exchanged with 1.9% by weight of Co in relation to the total weight of the catalyst, in the presence of 10% oxygen, depending on the reduction temperature.

It can be seen from Table 3 and from FIG. 2 that a catalyst according to the invention, consisting of a zeolite of mordenite structure with "small pores" exchanged with 1.6% by weight of palladium in relation to the total weight of the catalyst, has an $NO_x$ conversion activity much greater than those of the prior art at the same reduction temperature, that is to say 450° C. Thus, U.S. Pat. No. 149 512 reported an $NO_x$ conversion percentage of 27% at 450° C. with a mordenite with "large pores" whereas, with the catalyst of the invention, an $NO_x$ conversion percentage is obtained of between 60 and 65% between 400 and 450° C. and this in the presence of 10% oxygen.

It will also be noted that in the prior art, the zeolite was exchanged with 5.5% by weight of Co, whereas with the catalyst of the invention, better $NO_x$ conversion results are obtained by exchanging only 1.6% by weight of Co in the mordenite with "small pores".

EXAMPLE 3

$NO_x$ Reducing Activity of a Catalyst According to the Invention Containing 1.6% by Weight of Co and 0.47% by Weight of Pd A catalyst consisting of a zeolite of mordenite structure with "small pores" exchanged with 1.6% by weight of cobalt and 0.47% by weight of palladium in relation to the total weight of the catalyst was prepared under the same conditions as before from a mordenite in ammonium form.

The catalyst was tested under the following conditions:

| Test conditions: | NO: | 200 ppm |
|---|---|---|
| | $CH_4$: | 300 ppm |
| | $O_2$: | 10% by volume in relation to the total gaseous volume |
| | VVH: | 10,000 $h^{-1}$ |

VVH = hourly space velocity

The results of the test in terms of percentage of conversion of $NO_x$ and $CH_4$ are given in Table 4 below and illustrated in the form of a graph in the attached FIG. 3.

TABLE 4

| Temperature | Conversion (%) | |
|---|---|---|
| (° C.) | $CH_4$ | $NO_x$ |
| 300 | 8.7% | 8.3% |
| 350 | 42% | 36.9% |
| 400 | 100% | 70% |

Figure 3:
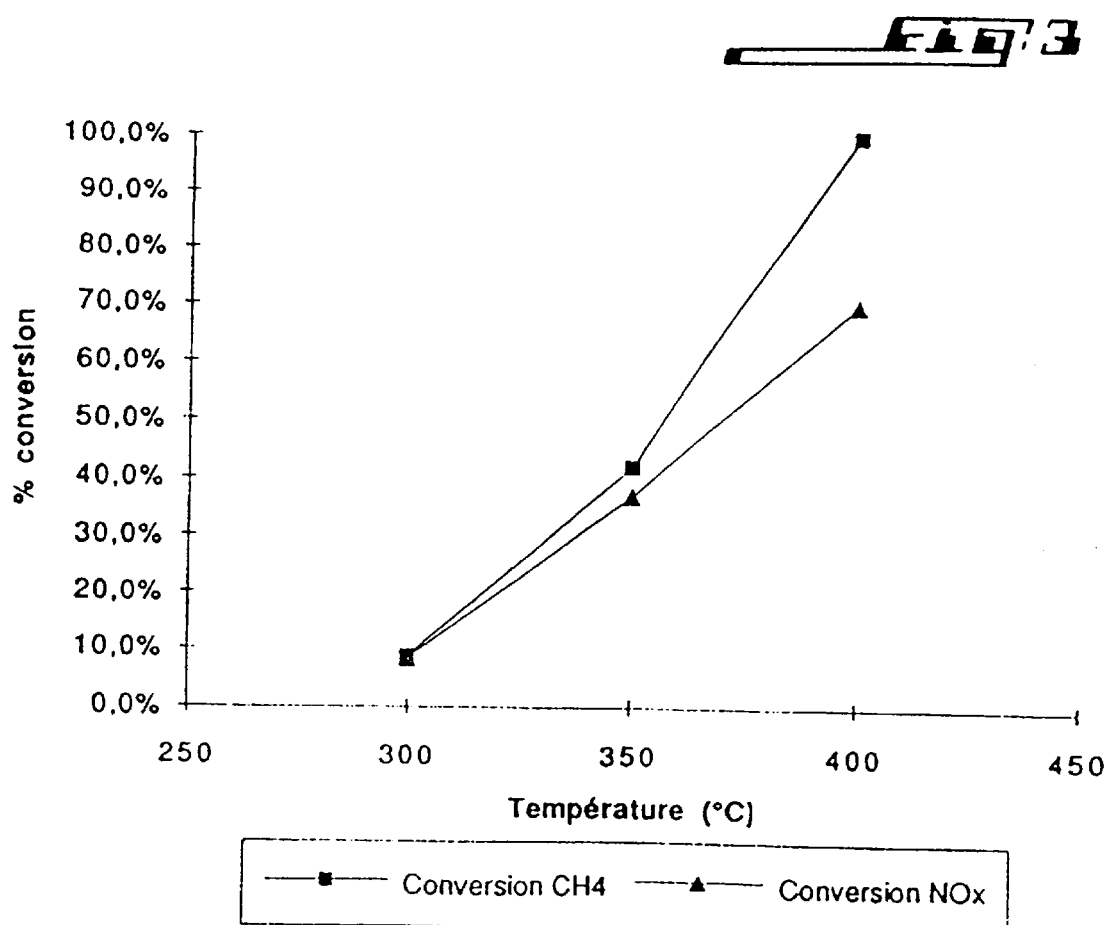
FIG. 3 illustrates the conversion percentages of $NO_x$ and $CH_4$ using a catalyst according to the invention consisting of a zeolite of mordenite structure with "small pores" exchanged with 1.9% by weight of Co and 0.6% by weight of Pd, in the presence of 10% oxygen, depending on the reduction temperature.

It can be seen from Table 4 and from FIG. 3 that the bimetallic Pd/Co catalyst has a great activity over a wide range of temperatures. It is also noted that the rate of conversion of $NO_x$ is maximized at 400° C. Indeed it is in the order of 70% with a total conversion of the methane and this in the presence of 10% oxygen.

In order to confirm the advantages of using a zeolite of mordenite structure with "small pores" exchanged with cobalt, palladium or a mixture of cobalt and palladium compared with the same catalyst consisting of a zeolite with "large pores", the following comparative tests were then carried out:

COMPARATIVE EXAMPLE NO. 1

Comparison of a catalyst consisting of a zeolite of mordenite structure with "small pores" and a catalyst consisting of a zeolite with "large pores", exchanged with 0.5% by weight of palladium:

Two catalysts were prepared, respectively, from a zeolite of mordenite structure with "small pores" in ammonium form exchanged with 0.5% by weight of Pd in relation to the total weight of the catalyst, and from a zeolite of mordenite structure in ammonium form with "large pores" exchanged with 0.5% by weight of Pd in relation to the total weight of the catalyst, under the same conditions as before.

These catalysts were tested under the following conditions:

| Test conditions: | NO: | 200 ppm |
|---|---|---|
| | $CH_4$: | 300 ppm |
| | $O_2$: | 10% by volume in relation to the total gaseous volume |
| | VVH: | 10,000 $h^{-1}$ |

VVH = hourly space velocity

The results of the tests are given in Table 5 below:

TABLE 5

| Reference | Temperature ° C. | Conversion $NO_x$ % |
|---|---|---|
| Mordenite with | 300 | 21 |
| "large pores" | 350 | 38 |
| | 400 | 47 |
| Mordenite with | 300 | 17 |
| "small pores" | 350 | 41 |
| | 400 | 53 |

As can be seen from Table 5, the catalyst consisting of a zeolite of mordenite structure with "small pores" has a greater activity than the catalyst consisting of a mordenite with "large pores".

COMPARATIVE EXAMPLE NO. 2

Comparison of a catalyst consisting of a zeolite of mordenite structure in ammonium form with "large pores"

exchanged with 0.57% by weight of Pd and 2.56% by weight of Co in relation to the total weight of the catalyst and a catalyst consisting of a zeolite of mordenite structure with "small pores" in ammonium form exchanged with 0.5% by weight of Pd and 2.51% by weight of Co in relation to the total weight of the catalyst.

The conditions for preparing the catalysts were identical with those of the previous Examples.

These catalysts were tested under the same conditions as Comparative Example No. 1.

The results of the tests are given in Table 6 below:

TABLE 6

| Reference | Temperature ° C. | Conversion NO$_x$ % |
| --- | --- | --- |
| Mordenite with "large pores" | 300 | 7.8 |
|  | 350 | 19.2 |
|  | 400 | 39.9 |
|  | 450 | 31.6 |
| Mordenite with "small pores" | 300 | 13.5 |
|  | 350 | 38.5 |
|  | 400 | 55.2 |
|  | 450 | 39.6 |

The result of Table 6 confirm the advantage of the bimetallic catalyst according to the invention compared with a catalyst consisting of a zeolite with "large pores" of the prior art.

Finally, in order to confirm the synergetic effect of Pd and Co in a catalyst of the invention, the three following additional tests were carried out, demonstrating that for a content of Pd+Co identical to the content of Co, very superior results are obtained with Pd+Co.

EXAMPLE 4

A catalyst according to the invention consisting of a zeolite of mordenite structure with "small pores" in ammonium form exchanged with 1.9% by weight of Co in relation to the total weight of the catalyst, a catalyst consisting of a zeolite of mordenite structure with "small pores" in ammonium form exchanged with 0.6% by weight of Pd in relation to the total weight of the catalyst, and a catalyst consisting of a zeolite of mordenite structure with "small pores" in ammonium form exchanged with 1.2% by weight of Co and 0.6% by weight of pd in relation to the total weight of the catalyst, were prepared under the same conditions as before.

Thus, the bimetallic catalyst tested has a content of Co+Pd equivalent to the content of Co only of the Co catalyst tested in this example.

The conditions of the tests were as follows:

| Test conditions: | NO: | 200 ppm |
| --- | --- | --- |
|  | CH$_4$: | 300 ppm |
|  | O$_2$: | 10% by volume in relation to the total gaseous volume |
|  | VVH: | 10,000 h$^{-1}$ |

VVH = hourly space velocity

The results of the tests are given in Table 7 below:

TABLE 7

| Reference | Temperature ° C. | Conversion CH$_4$ % | Conversion NO$_x$ % |
| --- | --- | --- | --- |
| Mordenite with "small pores" exchanged with 1.9% Co | 400 | 14 | 24.7 |
|  | 450 | 56 | 61.5 |
|  | 500 | 96 | 64.1 |
| Mordenite with "small pores" exchanged with 0.6% Pd | 300 | 18.2 | 15.4 |
|  | 350 | 52.7 | 41 |
|  | 400 | 92.7 | 53 |
| Mordenite with "small pores" exchanged with 1.2% Co and 0.6% Pd | 300 | 16 | 18 |
|  | 350 | 48 | 42 |
|  | 400 | 100 | 66 |
|  | 450 | 100 | 47.5 |

As can be seen from Table 7, with the bimetallic catalyst according to the invention, an NO$_x$ conversion rate of 66% is obtained at 400° C. This conversion rate is greater than that obtained with a catalyst according to the invention exchanged only with cobalt and also than that obtained with a catalyst exchanged only with palladium.

EXAMPLE 5

A catalyst according to the invention consisting of a zeolite of mordenite structure, in ammonium form with "small pores", exchanged with 3.2% by weight of cobalt in relation to the total weight of the catalyst and a catalyst according to the invention consisting of a zeolite of mordenite structure in ammonium form with "small pores" exchanged with 2.8% by weight of Co and 0.4% by weight of palladium in relation to the total weight of the catalyst were synthesized as before. These two catalysts were tested under the same conditions as before.

The results are given in Table 8 below:

TABLE 8

| Reference | Temperature ° C. | Conversion CH$_4$ % | Conversion NO$_x$ % |
| --- | --- | --- | --- |
| Mordenite with "small pores" exchanged with 3.2% Co | 400 | 33.3 | 31.6 |
|  | 450 | 86.0 | 49.2 |
|  | 500 | 100 | 39.9 |
| Mordenite with "small pores" exchanged with 2.8% Co and 0.4% Pd | 300 | 18.7 | 15.4 |
|  | 350 | 60 | 41.3 |
|  | 400 | 100 | 58.2 |
|  | 450 | 100 | 47.2 |

The results given in Table 8 confirm the synergetic effect obtained with the bimetallic catalyst of the invention exchanged with both Co and Pd, in terms of NO$_x$ conversion activity.

EXAMPLE 6

Influence of Oxygen on the Activity of the Bimetallic Catalyst of the Invention

A catalyst according to the invention consisting of a zeolite of mordenite structure with "small pores", in ammonium form, exchanged with 0.59% by weight of Pd and 1.18% by weight of Co in relation to the total weight of the catalyst was prepared as before.

This catalyst was tested with a reactional mixture containing increasing quantities of oxygen, going up to 10% by volume in relation to the total volume of the reactional mixture.

The conditions of the tests were as follows:

| Test conditions: | NO: | 200 ppm |
|---|---|---|
| | $CH_4$: | 300 ppm |
| | $O_2$: | 0 to 10% by volume in relation to the total gaseous volume |
| | T°: | 400° C. |
| | VVH: | 10,000 $h^{-1}$ |

VVH = hourly space velocity

The results of these tests are given in Table 9 below:

TABLE 9

| | Conversion % | |
|---|---|---|
| $O_2$ % | $CH_4$ % | $NO_x$ % |
| 0 | 58.7 | 100 |
| 1 | 72.7 | 59 |
| 2 | 74 | 57 |
| 4 | 87.3 | 56 |
| 6 | 94 | 55 |
| 8 | 96.7 | 55 |
| 10 | 100 | 55 |

It can be seen from Table 9 that with the catalyst of the bimetallic type according to the invention, the $NO_x$ conversion rate is total in the absence of oxygen. This result is surprising compared with other catalytic systems of the prior art which do not allow such a result to be obtained in the sence of oxygen.

It can also be seen that excellent $NO_x$ conversion rates are still obtained even in the presence of 10% oxygen. Moreover the $NO_x$ conversion rate in the presence of 10% oxygen is roughly equivalent to the $NO_x$ conversion rate in the presence of only 1% oxygen.

EXAMPLE 7

Influence of Water on the Activity of the Bimetallic Catalyst of the Invention

A catalyst according to the invention consisting of a zeolite of mordenite structure with "small pores", in ammonium form, exchange with 0.50% by weight of Pd and 2.56% by weight of Co in relation to the total weight of the catalyst was prepared as before. This catalyst corresponds approximately to the catalyst of Example 3. This catalyst was tested with a reactional mixture containing between 0% and 10% water.

The conditions of the tests were as follows:

| Test conditions: | NO: | 200 ppm |
|---|---|---|
| | $CH_4$: | 300 ppm |
| | $O_2$: | 10% by volume in relation to the total gaseous volume |
| | $H_2O$: | 0%, 3% and 10% by volume in relation to the total gaseous volume |
| | VVH: | 10,000 $h^{-1}$ |

VVH = hourly space velocity

The results of the tests are given in Table 10 below:

TABLE 10

| Temperature of | % conversion of $NO_x$ | | |
|---|---|---|---|
| conversion in ° C. | 0% $H_2O$ | 3% $H_2O$ | 10% $H_2O$ |
| 350 | 38.5 | 28.6 | 26.2 |
| 400 | 55.2 | 53.3 | 41.4 |
| 450 | 39.6 | 39.5 | 39.5 |

Catalysts are generally very sensitive to the presence of water.

However the results given in Table 10 show that the catalyst of the invention only loses a small amount of activity in the presence of up to 10% by volume of water at conversion temperatures of 350° and 400° C.; on the other hand, it does not lose any activity at 450° C.

EXAMPLE 8

Influence of the Presence of Sulphur Compounds on the Activity of the Bimetallic Catalyst of the Invention Catalysts are known to have a very great sensitivity to "sulphur poisons".

The catalyst of Example 6 was then tested in the presence of 3% by volume of water in relation to the total gaseous volume and 0, 50 ppm and 500 ppm $SO_2$, respectively.

The conditions of the tests were as follows:

| Test conditions: | NO: | 200 ppm |
|---|---|---|
| | $CH_4$: | 300 ppm |
| | $O_2$: | 10% by volume in relation to the total gaseous volume |
| | $H_2O$: | 3% by volume in relation to the total gaseous volume |
| | $SO_2$: | 0, 50 and 500 ppm |
| | VVH: | 10,000 $h^{-1}$ |

VVH = hourly space velocity

The results of the tests are given in Table 11 below:

TABLE 11

| | % conversion of $NO_x$ | | |
|---|---|---|---|
| Temperature of reaction in ° C. | 3% $H_2O$ + 0 ppm $SO_2$ | 3% $H_2O$ + 50 ppm $SO_2$ | 3% $H_2O$ + 500 ppm $SO_2$ |
| 350 | 28.6 | 32 | 19.2 |
| 400 | 53.3 | 56.5 | 36.8 |
| 450 | 39.5 | 41.2 | 37.5 |

It can be seen from the results in Table 11 that the bimetallic catalyst of the invention maintains its activity even in the presence of 50 ppm of $SO_2$ regardless of the conversion temperature. Even better, at 450° C. the catalyst of the invention maintains its activity even in the presence of 500 ppm of $SO_2$.

From the results of Examples 6 to 8, it can be seen that the bimetallic catalyst according to the invention is very insensitive to water and to $SO_2$, including under the conditions in which a catalyst according to the invention containing only Co became inactive.

The bimetallic catalyst according to the invention therefore has numerous advantages and is a particularly preferred embodiment of the invention.

EXAMPLE 9

Influence of the Concentration of NO on the Activity of the Bimetallic Catalyst According to the Invention The same catalyst as those in Examples 6 and 8 was tested in the presence of up to 600 ppm of NO.

The conditions of the tests were as follows:

| Test conditions: | $CH_4/NO$: | 1.5 |
| --- | --- | --- |
| | $O_2$: | 10% by volume in relation to the total gaseous volume |
| | VVH: | 10,000 $h^{-1}$ |

VVH = hourly space velocity

The results of the tests are given in Table 12 below:

TABLE 12

| Temperature of conversion ° C. | % conversion of $NO_x$ | |
| --- | --- | --- |
| | 200 ppm NO | 600 ppm NO |
| 350 | 38.5 | 50.3 |
| 400 | 55.2 | 78 |
| 450 | 39.6 | 71.7 |

It can be seen from the results in Table 12 that the bimetallic catalyst according to the invention also has an excellent $NO_x$ conversion activity in the presence of strong concentrations of NO.

EXAMPLE 10

Influence of the Concentration of Co and Pd on the Activity of the Catalysts According to the Invention Finally, in order to better demonstrate the excellent properties of the catalysts of the invention, the results of the tests carried out on these catalysts are entered in Table 13 below.

The conditions of the tests were as follows:

| Test conditions: | NO: | 200 ppm |
| --- | --- | --- |
| | $CH_4$: | 300 ppm |
| | $O_2$: | 10% by volume in relation to the total gaseous volume |
| | VVH: | 10,000 $h^{-1}$ |

VVH = hourly space velocity

TABLE 13

| Catalyst mordenite with small pores exchanged with | | Temperature of conversion in ° C. | | | | | | |
| --- | --- | --- | --- | --- | --- | --- | --- | --- |
| | | 300 % conversion | | 350 % conversion | | 400 % conversion | | 450 % conversion | |
| % Pd | % Co | $CH_4$ | $NO_x$ | $CH_4$ | $NO_x$ | $CH_4$ | $NO_x$ | $CH_4$ | $NO_x$ |
| 0.37 | 0 | | | 26.2 | 21.2 | 59.2 | 32.7 | 100 | 34.7 |
| 0.5 | 0 | 18.2 | 15.4 | 52.7 | 41.0 | 92.7 | 53.0 | | |
| 0.6 | 0 | 18.2 | 15.4 | 52.7 | 41.0 | 92.7 | 53.0 | | |
| 0 | 1.13 | | | | | 11.8 | 13.1 | 25.4 | 22.2 |
| 0 | 1.6 | | | | | 14.0 | 24.7 | 56.0 | 61.5 |
| 0.36 | 2.81 | 18.7 | 15.4 | 60 | 41.3 | 100 | 58.2 | 100 | 47.2 |
| 0.4 | 2.80 | 18.7 | 15.4 | 60.9 | 41.3 | 100 | 58.2 | 100 | 47.2 |
| 0.46 | 2.45 | | | 82.4 | 41.8 | 100 | 50 | 100 | 39.5 |
| 0.47 | 1.6 | 8.7 | 8.3 | 42 | 36.9 | 100 | 70 | | |
| 0.50 | 2.51 | 14 | 13.5 | 55.3 | 38.5 | 100 | 55.2 | 100 | 39.6 |
| 0.59 | 1.18 | 16 | 18 | 48 | 42 | 100 | 66 | 100 | 47.5 |
| 0.60 | 2.20 | 10.6 | 13.7 | 60.9 | 47.1 | 100 | 66.7 | 100 | 50 |
| 0.60 | 1.90 | 8.7 | 8.3 | 42 | 36.9 | 100 | 70 | 100 | 47.5 |
| 0.60 | 1.2 | 16 | 18 | 48 | 42 | 100 | 66 | | |
| 0.44 | 3.17 | 36.2 | 33.7 | 96.8 | 52.6 | 100 | 46.5 | | |

Of course, the invention is in no way limited to the embodiments described and illustrated which are only given by way of example.

On the contrary, the invention includes all technical equivalents of the means described as well as combinations of these if these are effected in accordance with the spirit of the invention.

What is claimed is:

1. Catalyst for reducing $NO_x$ using methane or any mixture containing mostly methane comprising a zeolite of mordenite structure having a pore diameter smaller than 5 Å, said zeolite being exchanged with between 0.4% and 0.6% by weight of Pd in the form of $Pd^{2+}$ and/or between 1.2% and 3.2% by weight of Co in the form of $Co^{2+}$ in relation to the total weight of the catalyst.

2. Catalyst according to claim 1 in which the zeolite is in sodic form or in ammonium form with an Si/Al molar ratio equal to 5.5.

3. Catalyst according to claim 1 in which the zeolite is exchanged with Pd only.

4. Catalyst according to claim 1 in which the zeolite is exchanged with Co only.

5. Catalyst according to claim 1 in which the zeolite is exchanged with Pd and Co.

6. Method of reducing $NO_x$ using methane or any mixture containing mostly methane, comprising bringing a reaction medium comprising $NO_x$, and methane into contact with the catalyst according to claim 1.

7. Method of reducing $NO_x$ according to claim 6, characterized in that the reaction medium also contains oxygen.

8. Method according to claim 6, characterized in that the reaction medium also contains sulphur compounds.

9. Method according to claim 6, characterized in that the reaction mixture also contains water.

* * * * *

UNITED STATES PATENT AND TRADEMARK OFFICE
CERTIFICATE OF CORRECTION

PATENT NO. : 6,063,351

DATED : May 16, 2000

INVENTOR : Christian HAMON et al.

It is certified that error appears in the above-identified patent and that said Letters Patent is hereby corrected as shown below:

On the title page, please insert the reference to the foreign application priority as follows:

--[30] Foreign Application Priority Data

Oct. 10, 1996  [FR]  France .......................... 96 12 386--.

Signed and Sealed this

Twentieth Day of March, 2001

*Attest:*

NICHOLAS P. GODICI

*Attesting Officer*   *Acting Director of the United States Patent and Trademark Office*